April 9, 1935.  B. A. HULTQUIST ET AL  1,997,333
ROLL FILM CAMERA
Filed March 1, 1934   2 Sheets-Sheet 1
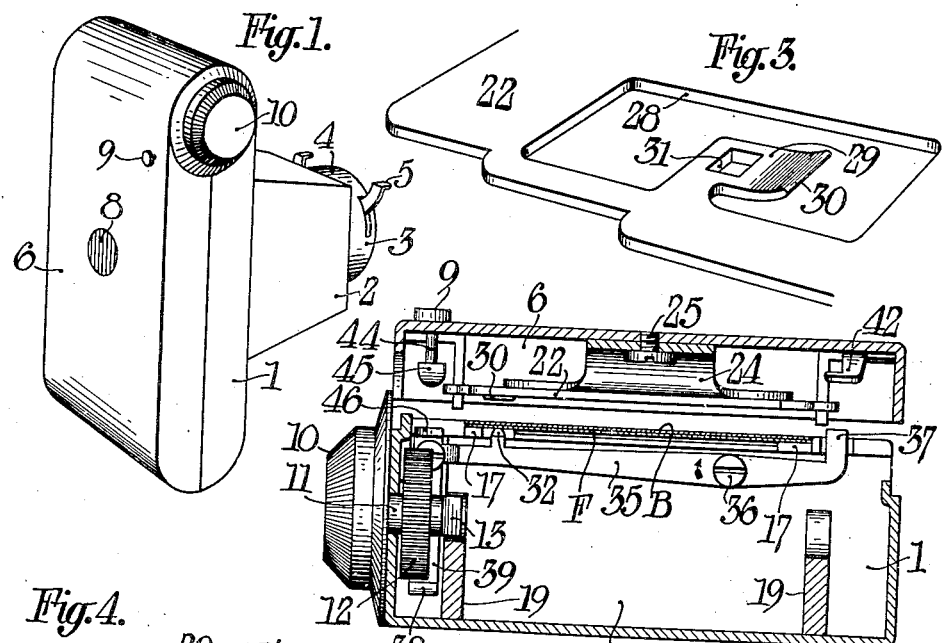
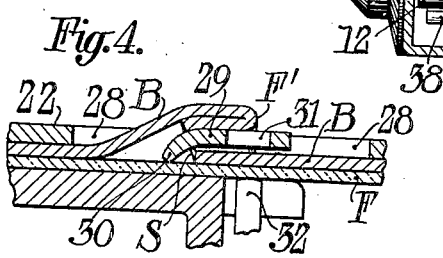
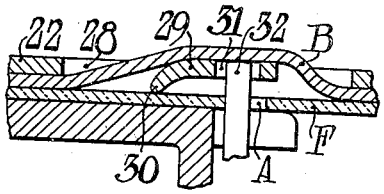
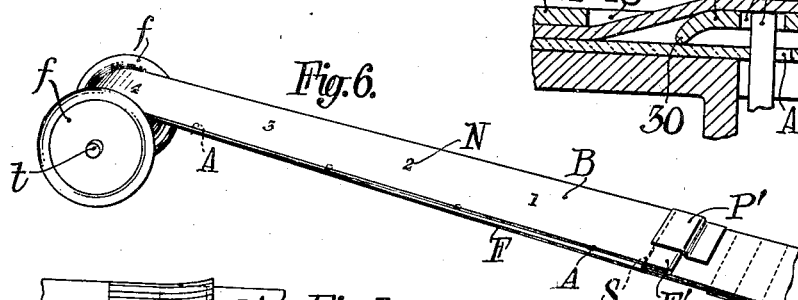
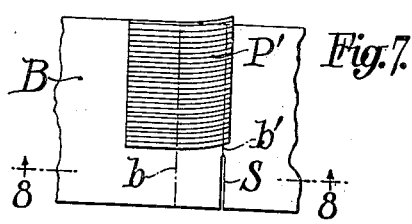
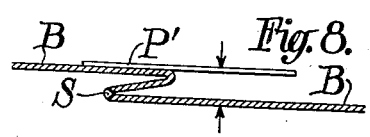
Inventors:
Bernard A. Hultquist & Elmer R. Bradford,
By Newton M. Perrins,
Donald H. Stewart
Attorneys

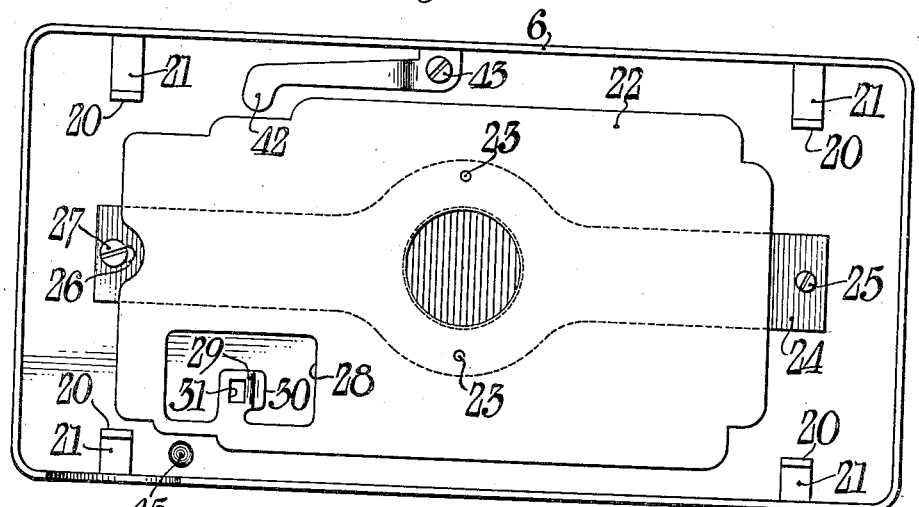
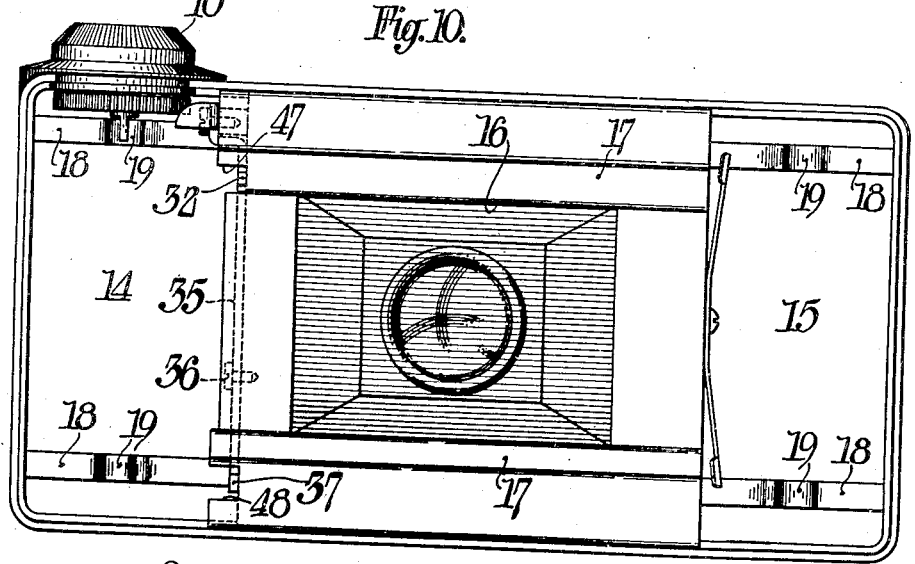
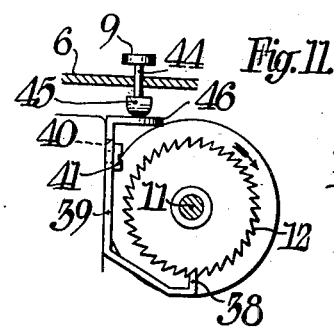

Patented Apr. 9, 1935

1,997,333

UNITED STATES PATENT OFFICE 1,997,333

ROLL FILM CAMERA

Bernard A. Hultquist and Elmer R. Bradford, Rochester, N. Y., assignors to Eastman Kodak Company, Rochester, N. Y., a corporation of New York Application March 1, 1934, Serial No. 713,549

24 Claims. (Cl. 95—31)

This invention relates to photography and particularly to roll film cameras. One object of our invention is to provide a film camera particularly adapted for use with small sizes of film in which the film can be easily wound between the various exposure areas. Another object of our invention is to provide an automatic stop for the winding mechanism so that an operator will not have to watch for a numeral appearing in a red window in the back of the camera. Another object of our invention is to provide a film stopping mechanism comprising a film engaging lug adapted to enter an aperture in the film and to provide a means for automatically separating the backing paper and film near the film locking lug so that a space is provided for the lug to enter. Another object of our invention is to provide a film winding device which can be readily threaded and wound freely through the camera when the camera back is removed. Another object of our invention is to provide a simple releasing mechanism for the film latch. Still another object of our invention is to provide a special type of film and camera mechanism to cooperate with the film, and other objects will appear from the following specification, the novel features being particularly pointed out in the claims thereof.

Coming now to the drawings wherein like reference characters denote like parts throughout:

Fig. 1 is a perspective view of a small size camera equipped with a winding mechanism constructed in accordance with and embodying a preferred form of our invention.

Fig. 2 is an enlarged sectional view through one of the spool chambers shown in Fig. 1 illustrating the winding mechanism and the automatic latch for the winding mechanism, the cover being shown partially removed from the camera.

Fig. 3 is an enlarged fragmentary view showing in perspective the film separator.

Figs. 4 and 5 are enlarged sectional views showing in Fig. 4 the separator passing from the outside of the backing paper to a position between the backing paper and film and showing in Fig. 5 the position of the film and the backing paper when a film area is positioned for exposure.

Fig. 6 is a perspective view of a film cartridge especially designed for use with this camera.

Fig. 7 is a fragmentary detail plan view of a portion of the backing paper slit for use in this camera with the folding lines shown in broken lines and with a paster shown as being attached to the backing paper.

Fig. 8 is a section on line 8—8 of Fig. 7, but with the backing paper partially folded.

Fig. 9 is an enlarged plan view of the camera back removed from the camera.

Fig. 10 is a similar enlarged view of the camera.

Fig. 11 is a fragmentary detail view showing the film winding mechanism latch.

Our invention comprises broadly a camera and film with which it is possible to turn a winding mechanism to position a fresh area of film for exposure and to provide a means for automatically locking this mechanism as soon as the film area is positioned.

As shown in Fig. 1, the camera may consist of a body portion 1 having a front section 2 carrying a shutter 3 which may be of any of the well-known types which supports an objective. In the present instance, the shutter is shown as having a setting lever 4 and a trigger 5 for making the exposure. The camera body 1 is provided with a removable camera back 6 in which there may be located a red window 8. The back also carries a small push button 9 and on the side wall of the camera there is a winding knob 10.

Referring particularly to Fig. 2, the winding knob 10 is carried by a shaft 11 to which a ratchet 12 is affixed, the shaft 11 terminating in a web 13 adapted to enter the usual slot in a film spool hub. By turning the winding knob 10, a film spool in the take-up chamber 14 may be rotated to wind film thereon.

As indicated in Fig. 10, the camera body contains a take-up spool chamber 14 and a supply spool chamber 15 between which there is the usual exposure frame 16. This exposure frame defines the field of view and also provides a pair of rails 17 which may support the edges of a film F being wound from the supply chamber 15 to the take-up chamber 14.

Any desired type of spool holding mechanism may be used, the one here shown consisting of a pair of parallel brackets 18 in the supply chamber 15, these brackets being notched at 19 to receive film spool trunnions.

The take-up chamber 14 is similar to 15 in that there are a pair of brackets 18 notched at 19 just the same as the brackets in the supply spool chamber.

The camera back 6, best shown in Fig. 9, is also provided with downwardly extending arms 20 on the ends of the brackets 21. These arms project downwardly and hold the film spool trunnions accurately in the notches 19 in a known manner.

The camera back 6 is likewise provided with a film pressure pad 22 here shown as being attached as by means of rivets 23 to a spring 24, one end of which is attached at 25 to the camera back and the opposite end through its slot 26 may have a sliding engagement with a stud 27 carried by the camera back. As indicated in Fig. 2, this spring normally holds the presser plate 22 some distance from the back in a position to resiliently engage the film backing paper B of a film F being wound through the camera.

The presser plate 22 differs from the normal presser plate in having a cut-out area 28. Into this cut-out area the separator 29 projects, this separator having a downwardly projecting knife-like edge 30 adapted to engage the backing paper or film as will be hereinafter more fully described. The separator 29 may be provided with an aperture 31 into which a film locking lug 32 may enter, although this aperture may be omitted and the separator may be located to one side of the locking lug 32 if desired.

The function of the separator 30 is that it will separate an area of the film and backing paper in such a manner that the locking lug 32 will have room to pass through the film aperture and lock the mechanism without striking the backing paper.

As indicated in Fig. 6, the film F may be wound on a known type of spool consisting of flanges f with film trunnions t projecting outside of the flanges. The film may be of any of the well-known types, differing solely in that a series of apertures A are provided, spaced in accordance with the exposure aperture 16. The apertures A are preferably spaced apart a distance somewhat greater than the length of the exposure frame.

The film F is attached to the backing paper B along one end of the film by means of a paster P. A second paster P' is for holding a fold F' in the backing paper, this fold being provided with a slot S extending in from one edge of the backing paper only a short distance as is shown in Fig. 7. In this figure, to properly prepare the backing paper for the film cartridge, the paper is bent along the broken lines b and b1 so that the slot S will lie underneath the fold as indicated in Fig. 8. The paster P' is then pressed against the backing paper B in the direction shown by the arrows in Fig. 8 and the fold is properly positioned.

It should be noted that this fold lies between one of the apertures A in the film and the paster P.

The reason for this is that it is desirable to have the separator 29 press upon the outside of the backing paper B during the initial threading of the film and after the camera back has been placed on the camera and the winding knob is turned, the presser will continue to press on the backing paper as it is wound under the separator until the fold is reached. When the fold is reached, the separator will pass through the slot S underneath the fold in the backing paper and will separate a small area of backing paper from the film—an area sufficient to give clearance for the film engaging lug 32.

A separate application is being filed covering the film particularly adapted for use in this camera, see Serial No. 713,548, Hultquist and Bradford, filed March 1, 1934.

Figs. 4 and 5 illustrate the position of these parts during the winding operation. In Fig. 4 it will be noted that the fold F1 in the backing paper B has just reached the separator 29 and the knife-like edge 30 has passed beneath the fold and partially through the slot S. Thus, one section of the backing paper B is shown as lying beneath the separator and another section of the backing paper as having started to pass over the separator.

Fig. 5 indicates that as the film winding knob 10 continues to turn, the backing paper B will pass over the top of the separator 29 and the film F will continue to pass beneath the separator.

As soon as the knob 10 is turned a sufficient distance for the lug 32 to enter an aperture A in the film, the knob will be automatically locked against further movement by the mechanism best shown in Fig. 2. In this figure it will be seen that the lug 32 is carried by an arm 35 which is pivoted upon a stud 36 to the camera. Arm 35 likewise carries a tensioning lug 37 at one end and on the opposite end it carries a locking pawl 38 on the end of an arm 39 which is preferably made integral with arm 35. Arm 39 is provided with a slot 40 (see Fig. 11), this slot passing around a stud 41 by which it is guided. Thus, the locking pawl 38 is definitely guided through a fixed path and it may engage or disengage the ratchet 12 carried by the shaft 11.

When the lug 32 enters an aperture in the film F, as shown in Fig. 5, the locking pawl 38 engages the ratchet 12, as indicated in Fig. 11, and prevents further movement thereof. When, however, the lug 32 is riding on the underside of the film F, as is indicated in Fig. 4, the pawl 38 is held out of engagement with the ratchet 12 and the winding mechanism can turn freely.

It should be especially noted that the lug 37 lies in the path of a spring 42 which is attached at 43 to the camera back 6, as best shown in Fig. 2. When the camera back 6 is removed from the camera for threading film, there is no tension on the arm 35 and consequently the locking lug 38 is not urged into engagement with the pawl 12, the winding knob 10 can be freely turned until the backing paper is partially wound through the camera, after which the camera back 6 is placed on the camera.

This brings spring 42 into contact with the tensioning knob 37 and causes the lever 35 to tend to turn in the direction shown by the arrow in Fig. 2, forcing lug 32 upwardly against the film F.

As above explained, the winding knob is turned until the lug 32 drops into an aperture A and the pawl 38 by engaging the ratchet 12 locks the winding mechanism. After making an exposure in the usual manner, the lever 35 may be moved from its operative or locking position by pressing the button 9 on the camera back 6.

This button, as shown in Fig. 2, is provided with a shank 44 terminating in a knob 45, the knob lying in the path of a releasing lug 46 likewise carried by the lever 35. The releasing lug 46 is shown in its proper relation to the knob 9 and camera back 6 in Fig. 11.

Referring to Fig. 2, the film band which consists of the backing paper B and the film F is guided across the exposure frame on the rails 17. It should be noted that the lug 32 lies in a notch or cut-out 47 at the end of one of the rails 17 and consequently, even though it may come into engagement with the emulsion side of the film, it will not touch any portion of the film on which an exposure is to be made. The tensioning lug 37 of lever 35 extends through a notch 48 beyond the opposite rail 17 so that it passes up past the film band without touching it.

The separator 29 preferably forms an integral part of the presser 22 and consequently it resiliently presses upon the film backing paper since it is impelled towards the backing paper by means of the spring 24 when the camera back is in place. The presser member 22 holds the film and backing paper flat over the entire exposure area 16, but when the separator enters between the film and backing paper, the film will remain flat but the backing paper throughout a small area will be raised from the film, thus leaving the clear space through which the locking lug 32 may function. This does not in any way disturb the position of the film over the exposure area. It should be noted that Figs. 4 and 5, which illustrate the relative position of the separator, backing paper, and film, are drawn on a greatly exaggerated scale, as it will be realized that the film and backing paper are only a few thousandths of an inch thick and it is impossible to show them on anything like the proper scale. The separator is also on an exaggerated scale. It is usually sufficient to make it of metal .015 or .020 of an inch thick, so that the actual separation of the film and backing paper is but little.

The operation of a camera constructed in accordance with our invention is extremely simple. Removing the camera back 6, a fresh roll of film may be placed in the spool chamber 15 and the backing paper may be drawn out and threaded into a spool placed in spool chamber 14 with one trunnion in operative engagement with the winding web 19. The winding knob 10 may be given a few turns until the paper is properly threaded around the spool hub and the camera back 16 may then be placed on the camera.

The winding knob 10 will turn freely as the separator 29 rides along on top of the backing paper B and as this winding movement is continued, the film backing paper will move toward the separator until it passes through the slot S beneath the front F1. This immediately spaces a small area of the backing paper from the film and permits the locking lug 32 to snap through the first film aperture A which is reached.

When this occurs, the pawl 38 moves into an operative or locking position in engagement with the ratchet 12 and the winding knob 10 is automatically locked against movement as soon as the film is positioned for exposure.

If desired, the film may be provided with the usual numbers N on the backing paper, indicating the number of exposures, these numbers being so positioned that they will lie opposite the red window 8. Thus, an operator, by glancing at the camera, can tell the number of exposures. This is not essential, however, and the red window may be entirely omitted if desired.

After making the exposure in the usual way by depressing the trigger 5, in order to wind a fresh area of film into place, the push button 9 is pressed as the knob 10 is turned. As soon as an aperture A moves away from the lug 32, the push button 9 may be released and the film may be wound freely by turning the knob 10 until the second aperture is reached. This will again lock the winding knob.

It is quite obvious that our invention is not restricted to any particular type or size of camera and we contemplate as within the scope of our invention all such cameras as may come within the scope of the appended claims.

Having thus described our invention, what we claim as new and desire to secure by Letters Patent of the United States is:

1. In a camera adapted for use with perforated roll film, the combination with a camera body including an exposure frame and spool chambers at each end thereof, of means for winding film through said camera including a winding knob, an automatic stop for the winding knob, means for actuating the stop including a lug adapted to engage a film aperture, and a separator carried by the camera near said film engaging lug adapted to separate an area of backing paper from an area of film whereby said film engaging lug may have room to project through said aperture.

2. In a camera adapted for use with perforated roll film, the combination with a camera body including a camera back, an exposure frame and spool chambers at each end thereof, of means for winding film through said camera including a winding knob, an automatic stop for the winding knob, means for actuating the stop including a lug adapted to engage a film aperture, and a separator carried by the camera back and adapted to lie adjacent to the film engaging lug and adapted to separate an area of backing paper from an area of film whereby said film engaging lug may have room to project through said aperture.

3. In a camera adapted for use with perforated roll film, the combination with a camera body including a camera back, an exposure frame and spool chambers at each end thereof, of means for winding film through said camera including a winding knob, an automatic stop for the winding knob, means for actuating the stop including a lug adapted to engage a film aperture, and a separator carried by a resilient support and pressed toward the film engaging lug, said separator being adapted to separate an area of backing paper from an area of film whereby said film engaging lug may have room to project through said aperture.

4. In a camera adapted to use a perforated film including a backing paper with a slot therein, the combination with a winding device for the film, a lock for the winding device including a lug adapted to enter a film perforaton, and means for separating a portion of the film and backing paper, whereby said lug may project through the aperture sufficiently to actuate said lock.

5. In a camera adapted to use a perforated film including a backing paper with a slot therein, the combination with a winding device for the film, a lock for the winding device including a lug adapted to enter a film perforation, and means for separating a portion of the film and backing paper at an area near said lug, whereby said lug may project through the aperture sufficiently to actuate said lock.

6. In a camera adapted to use a perforated film including a backing paper with a slot therein, the combination with a winding device for the film, a lock for the winding device including a lug adapted to enter a film perforation, and means carried by the camera back for separating a portion of the film and backing paper to expose an aperture in the film, whereby said lug may freely enter said aperture and actuate said lock.

7. In a camera adapted to use a perforated film including a backing paper with a slot therein, the combination with a winding device for the film, a lock for the winding device including a lug adapted to enter a film perforation, and means for separating a portion of the film and backing paper for resilient pressing upon said backing paper and for passing through the slot therein to separate the film and backing paper as the film is wound, whereby said lug may pass freely through said film aperture and may actuate said lock.

8. In a camera adapted to use a perforated film including a backing paper with a slot therein, the combination with a winding device for the film, a lock for the winding device including a lug adapted to enter a film perforation, and means including a knife-like member resiliently mounted to press upon said backing paper, the knife-like member being adapted to pass through the slot in the backing paper as the film band is wound by the winding device.

9. In a camera adapted to use a perforated film including a backing paper with a slot therein, the combination with a winding device for the film, a lock for the winding device including a lug adapted to enter a film perforation, and means including a knife-like member resiliently mounted to press upon said backing paper, the knife-like member being adapted to pass through the slot in the backing paper as the film band is wound by the winding device, the knife-like member being adapted to separate a small area of film from the backing paper and being located near the winding device locking lug, providing a space into which the lug may enter through the film aperture.

10. In a camera adapted to use a perforated film including a backing paper with a slot therein, the combination with a winding device for the film, a lock for the winding device including a lug adapted to enter a film perforation, and means including a presser member adapted to hold the film flat for exposure, and a knife-like member carried by the presser member and adapted to separate an area of the film and backing paper to permit the winding device locking lug to enter an aperture in the film.

11. In a camera adapted to use a perforated film including a backing paper with a slot therein, the combination with a winding device for the film, a lock for the winding device including a lug adapted to enter a film perforation, and means including a presser member adapted to hold the film flat for exposure, and a knife-like member carried by the presser member located in an opening in the presser member and having an edge extending to one side of the presser member and adapted to engage and pass through the slotted film backing paper, whereby an area of the backing paper may be separated from the film to permit the winding device locking lug to pass freely through a film aperture.

12. In a camera adapted for use with a film band having perforated film and slotted backing paper, the combination with a winding key, a locking device for the winding key including a pawl and ratchet carrying lever, a lug on said lever adapted to enter a perforation in the film, and means on the camera back for urging the lug toward the film.

13. In a camera adapted for use with a film band having perforated film and slotted backing paper, the combination with a winding key, a locking device for the winding key, including a lug adapted to enter a film, and a means for impelling said lug carried by the camera back.

14. In a camera adapted for use with a film band having perforated film and slotted backing paper, the combination with a winding key, a locking device for the winding key including a lug adapted to enter a film, and means carried by the camera back for separating the film and backing paper.

15. In a camera having a front and back and adapted to use a film band, the combination of a winding key, means for locking the winding key against rotation, a spring for actuating said means, said spring being so positioned and arranged that it may act on the means for locking the winding key against rotation only when said camera back is in operative position on the camera.

16. In a camera adapted for use with a film band having a slot in the backing paper and perforated film, means for winding film through the camera, a removable camera back, means included in the camera back for automatically separating the film and backing paper as said film band is wound through said camera.

17. In a camera adapted for use with a film band having a slot in the backing paper and perforated film means for winding film through the camera, a presser for holding the film flat in the camera, means carried by the presser adapted to automatically pass through the slotted backing paper and between the film and backing paper as the film is wound through the camera.

18. In a film winding apparatus, the combination with a camera, of a film winding means, an exposure frame and a film and backing paper separator located over the back of the exposure frame; said camera being adapted for use with a film adapted to be wound through said camera comprising a folded backing paper having a slot in one fold thereof, a film attached to the backing paper near the fold therein, said film including apertures spaced in proportion to the exposure frame of the camera; a resilient presser for the film and backing paper carrying the film and backing paper separator pressing the separator into contact with the backing paper, whereby said separator may pass into the fold therein and through the slot to separate the film and backing paper before an aperture of the film is reached.

19. In a film winding apparatus, the combination with a camera, of a film winding means, an exposure frame and a film and backing paper separator located over the back of the exposure frame; said camera being adapted for use with a film adapted to be wound through said camera comprising a folded backing paper having a slot in one fold thereof, the film being attached to the backing paper near the fold therein, said film including apertures spaced in proportion to the exposure frame of the camera; a resilient presser for the film and backing paper resiliently carrying the film and backing paper separator for pressing the separator into contact with the backing paper, whereby said separator may pass into the fold therein and through the slot to separate the film and backing paper before an aperture of the film is reached, and a film aperture engaging lug carried by the camera adapted to engage an aperture in the film at the place where the backing paper is separated therefrom.

20. In a camera, including a removable back, the combination with a film winding means, of an exposure area and a film and backing paper separator carried by the camera back; said camera being adapted for use with a film band, comprising a slotted backing paper, a film attached to said backing paper and containing perforations spaced in accordance with the camera exposure area; the film and paper separator being positioned by the camera back to press on the backing paper and to pass through the slot therein as the backing paper is wound through the camera, a film aperture engaging lug movably mounted on the camera and adapted to pass through a film aperture where the backing paper is separated therefrom, and a latch operable through the lug for engaging and locking the film winding means against movement.

21. In a camera, the combination with a film winding means, of an exposure area and a film and backing paper separator carried over the back thereof; said camera being adapted for use with a film band, comprising a slotted backing paper, a film attached to said backing paper and containing perforations spaced in accordance with the camera exposure area; the film and paper separator being positioned to press on the backing paper and to pass through the slot therein as the backing paper is wound through the camera, a film aperture engaging lug movably mounted on the camera and adapted to pass through a film aperture where the backing paper is separated therefrom, and a latch operable through the lug for engaging and locking the film winding means against movement, said latch being moved to an operable latching position when said lug passes through a film aperture.

22. In a camera, the combination with a camera body, of a movably mounted camera back therefor, an exposure frame, film guiding rails along two sides of said exposure frame, spool chambers at the ends of the guide rails, a transverse pivoted lever at the end of the rails, a film engaging lug carried by said lever adapted to move to and from a position extending into the path of a film lying on said rails, a second lug carried by said lever projecting beyond the edge of a film lying on said rails, a spring carried by the camera cover adapted to press on the second lug and move the lever about its pivot moving the film engaging lug toward said film.

23. In a camera, the combination with a camera body, of a movably mounted camera back therefor, an exposure frame, film guiding rails along two sides of said exposure frame, spool chambers at the ends of the guide rails, a film winding device carried by the camera in one spool chamber, a transverse pivoted lever at the end of the rails, a film engaging lug carried by said lever adapted to move to and from a position extending into the path of a film lying on said rails, an arm extending to a position adjacent said film winding device, cooperating elements on said film winding device and said arm constituting a latch, a second lug carried by said lever projecting beyond the edge of a film lying on said rails, a spring carried by the camera cover adapted to press on the second lug and move the lever about its pivot moving the film engaging lug toward said film and urging the cooperating elements into a latching position.

24. In a camera, the combination with a camera body, of a movably mounted camera back therefor, an exposure frame, film guiding rails along two sides of said exposure frame, spool chambers at the ends of the guide rails, a film winding device carried by the camera in one spool chamber, a transverse pivoted lever at the end of the rails, a film engaging lug carried by said lever adapted to move to and from a position extending into the path of a film lying on said rails, an arm extending to a position adjacent said film winding device, cooperating elements on said film winding device and said arm constituting a latch, a second lug carried by said lever projecting beyond the edge of a film lying on said rails, a spring carried by the camera cover adapted to press on the second lug and move the lever about its pivot moving the film engaging lug toward said film and urging the cooperating elements into a latching position, and a push-button adapted to contact with said lever to move it against the cover spring pressure.

BERNARD A. HULTQUIST.
ELMER R. BRADFORD.